(No Model.)
L. E. WHITON.
WORK HOLDER.
No. 509,275. Patented Nov. 21, 1893.
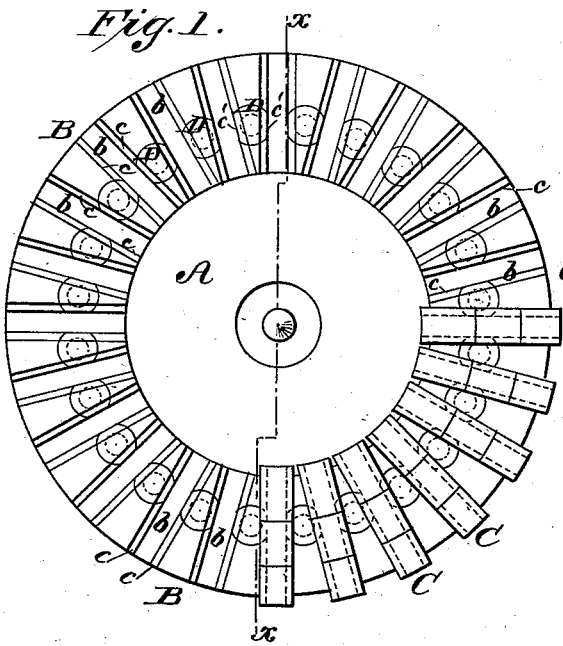
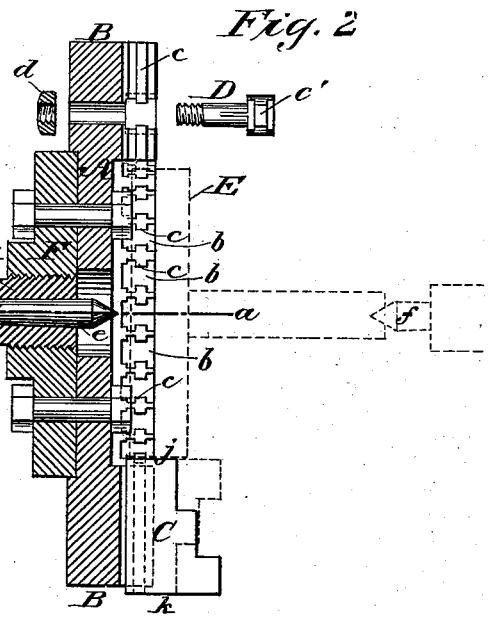
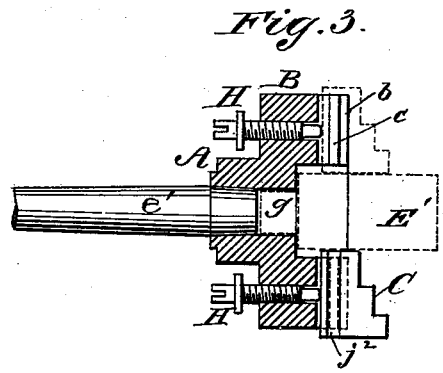
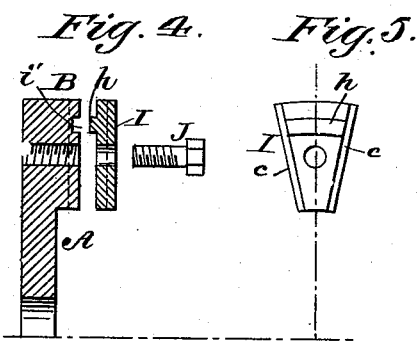
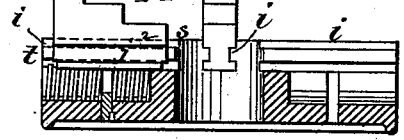
WITNESSES:
C. C. Martin.
Alice J. McCoy.
INVENTOR
Lucius E. Whiton
BY
Henry F. Parker.
ATTORNEY
THE NATIONAL LITHOGRAPHING COMPANY,
WASHINGTON, D. C.

UNITED STATES PATENT OFFICE.

LUCIUS E. WHITON, OF NEW LONDON, CONNECTICUT.

WORK-HOLDER.

SPECIFICATION forming part of Letters Patent No. 509,275, dated November 21, 1893.

Application filed September 24, 1892. Serial No. 446,767. (No model.)

*To all whom it may concern:*

Be it known that I, LUCIUS E. WHITON, a citizen of the United States, residing in the city and county of New London, State of Connecticut, have invented certain new and useful Improvements in Work-Holders, of which the following is a specification.

The object of my invention is to provide means for holding a maximum number of pieces of work in series in a lathe, to be turned simultaneously; and my said invention is adapted to turning the steps and ends of chuck jaws and to other work of similar character.

My said invention consists in a rotary holder containing a plurality of radial grooves or other holding devices for the work, greater than the number of radial grooves or equivalent of the chuck or other permanent device into which the finished pieces are intended to be permanently inserted, the said holding devices being so arranged that the inner ends of the adjacent holding devices will substantially meet.

Said invention also consists in the combination with such holder, of suitable means for clamping the pieces of work in concentric position thereon by compression parallel to the axis of the holder; and provision is also made for determining the radial adjustment of the pieces of work independently of such clamping devices.

Referring to the accompanying drawings, in which similar letters of reference indicate corresponding parts throughout the several views: Figure 1, is a front elevation or face view of the holder, showing some of the pieces of work inserted therein; Fig. 2, a sectional view of Fig. 1, taken on the line $x$—$x$; Fig. 3, a sectional view of a similar character of holder, showing a modification of the clamping device; Fig. 4, a partial section of another similar holder, showing a further modification of the clamping device; Fig. 5, a detail view of the sectoral clamping piece in Fig. 4; and Fig. 6, a sectional view of a completed chuck.

The work holder is composed of a plate A, having a projecting rim or flange B, whereon the work C, is temporarily supported concentrically with the axis $a$, $a$, of the holder.

A series of radial grooves $b$, is provided for holding the work, represented herein by the example of chuck-jaws C; and the said grooves $b$, have cross-sectional contours corresponding to those of the grooves $i$, (Fig. 6) in the chucks wherein the said jaws are intended to be permanently inserted. Such grooves $b$, have ribs $c$, as seen in Fig. 2, which fit corresponding grooves in the jaws C.

The holding devices upon the rim B, may be variously modified according to the character of the work.

The clamping devices illustrated in Figs. 1, and 2, consist in bolts D, the heads of which form a part of each rib $c$, $c$, as indicated at $c'$. The bolts D, are inserted so that the ribs $c'$, thereon coincide with the ribs $c$, in the grooves $b$, and the jaws C, can then be inserted. When the nuts $d$, are tightened, the ribs $c'$, are drawn inward, securely clamping the work after its proper radial adjustment has been determined.

The clamping device in Fig. 3, consists of a series of set-screws H, inserted through the back of the holder A, bearing at their inner ends on the pieces of work C, so as to clamp against the ribs $c$, $c$, outward.

The clamping device in Figs. 4, and 5, consists in series of sectoral plates I, upon the rim B, and suitable clamping bolts J. The plates I, with their ribs $c$, are also provided with arc-shaped tongues $h$, fitting the grooves $i'$, of the holding rim B, whereby to establish the proper position of the plates I, to hold the work. The plates I, are adapted to clamp inward against the base of the work C, within their grooves $j^2$, (Fig. 6.)

In each construction of clamping device shown, it will be observed that the compression for holding the work is exerted in a direction parallel with the axis $a$, $a$, of the holder.

The concentric adjustment of the work is effected by means of a removable disk E, indicated by dotted lines in Fig. 2, which is inserted into the cavity within the rim B, being mounted between centers $e$, $f$, upon a suitable arbor. After the pieces and the work C, are adjusted to abut on the periphery of the adjusting disk E, and securely clamped in place, the center $f$, of the tail stock is withdrawn and said disk removed, preparatory to the application of the lathe tool.

The centering device for the work in Fig. 3, consists of a cylindric piece E', inserted into the body of the holder A, by means of a shank g, indicated by dotted lines.

The holder A, is supported upon the lathe spindle G, in Fig. 2, by means of the face plate F, to which it is bolted as indicated. In Fig. 3, the holder A, is mounted upon the tapered end of a center e', inserted in the spindle.

Heretofore, chuck-jaws have been turned after being permanently mounted in the chuck K, as in Fig. 6, wherein it is customary to employ three or rarely more than four jaws. Consequently, the operation of finishing the jaws has been limited to three or four at a time, whereas in such device as illustrated in Fig. 1, twenty-four jaws may be finished in the same time, greatly expediting the work and reducing cost of production. Moreover, the chuck K, wherein the jaws are permanently mounted, being of greater radial dimension from s, to t, than the length of the jaws themselves, affords by the method employed heretofore, access to but one face of the jaws at a time in turning, whereas the important advantage is obtained in the use of the holder A, in that both ends of the jaws are exposed beyond the rim B, for turning without shifting their position.

The grooves b, or other holding devices are employed in a plurality adapted for the reception of the greatest number of pieces C, of the work that can be contained in the circumference of the circle desired.

The work C, may be inserted into the holder in either of two positions, as indicated by full lines and dotted lines respectively in Fig. 2, and also as indicated in Fig. 3.

Having thus fully described my invention, what I claim, and desire to secure by Letters Patent, is—

1. In a rotary holder for turning grooved chuck jaws, the combination with a radially grooved holding plate, the grooves in the plate having internal ribs to fit the grooves of the jaws, and clamping devices having their action parallel with the axis of the holder and clamping the jaws with their inner and outer ends unobstructed and exposed for the action of a turning tool.

2. A work holding plate, having a series of radial grooves, in combination with movable parts alternating the grooves, and having clamping ribs projecting therein, substantially as described.

3. A work holding plate, having a series of radial grooves, in combination with bolts alternating the grooves, and having clamping ribs projecting therein, substantially as described.

LUCIUS E. WHITON.

Witnesses:
CLARENCE E. ATKINS,
D. E. WHITON.